United States Patent [19]

Chetta, Jr.

[11] 3,955,487

[45] May 11, 1976

[54] WIENER CHARCOAL BROILER

[76] Inventor: Nicholas J. Chetta, Jr., 5865 Memphis St., New Orleans, La. 70124

[22] Filed: Nov. 25, 1974

[21] Appl. No.: 527,172

Related U.S. Application Data

[63] Continuation-in-part of Ser. No. 342,372, March 9, 1973, abandoned.

[52] U.S. Cl. ............................................. 99/384
[51] Int. Cl.² ....................... A47J 29/00; A47J 37/00
[58] Field of Search ............. 99/384, 375, 381, 372, 99/339; 126/400, 246; 219/10.55

[56] References Cited
UNITED STATES PATENTS

| 1,591,945 | 7/1926 | Sawkins | 99/381 |
| 1,950,772 | 3/1934 | Biggs | 99/381 |
| 2,153,256 | 4/1939 | Kovensky | 99/381 |
| 3,669,002 | 6/1972 | Davidson | 99/339 |
| 3,747,507 | 7/1973 | McIntosh | 99/339 |
| 3,792,653 | 2/1974 | Davidson | 99/339 |

Primary Examiner—Leonard D. Christian
Assistant Examiner—Donald B. Massenberg
Attorney, Agent, or Firm—Wilkinson, Mawhinney & Theibault

[57] ABSTRACT

The present disclosure is directed to a wiener charcoal broiler employing a base block of a heat sink metal such as aluminum which cooperates with metal spaced wiener supports which receive their heat source from the heat sink base which protects the wiener from coming into direct contact with the heat (cooking) source and the wiener is cooked from heat conducted through the wiener supports which engage the wiener along its length and which cooking imparts a charcoal or barbecue taste to the wiener without burning or scorching a substantial portion of the outer surface of the wiener.

2 Claims, 6 Drawing Figures

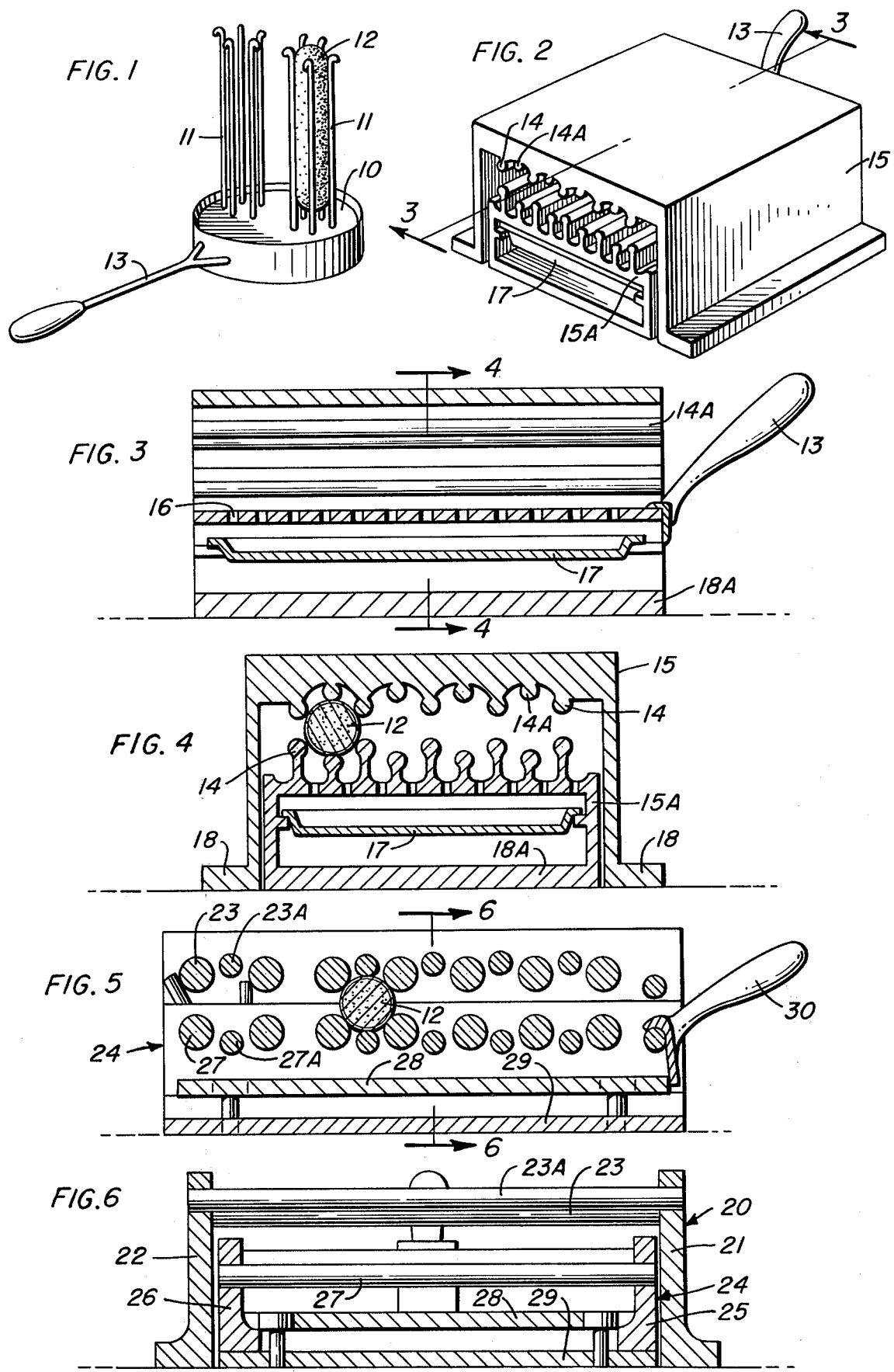

WIENER CHARCOAL BROILER

This application is a continuation-in-part of my similarly entitled application Ser. No. 342,372, filed Mar. 9, 1973 now abandoned.

An object of the present invention is to provide a novel apparatus for cooking wieners which imparts a charcoal taste to the wiener without exposing the wiener directly to the heat source which results in blistering or charring in an uneven and erratic discoloration pattern.

A further object of the present invention is the provision of an apparatus as described above which permits the wiener support upstanding from the heat base block to impart an external decor to the cooked wiener somewhat similar to branding the wiener which has a marked degree of novelty appeal to many wiener customers.

A further object of said invention would be to provide a means for cooking the wiener without the need for water, cooking containers, grill, electricity, and which would be readily adaptable to the cooking heat source in any kitchen or to other outdoor cooking heat source such as a common campfire.

A still further object of the invention is to provide an inexpensive wiener cooking utensil that can be used whenever a cooking heat source is available and which supports the wiener along its length without exposing the wiener directly to the cooking energy source.

With the foregoing and other objects in view, the invention will be more fully described hereinafter, and will be more particularly pointed out in the claims appended hereto.

In the drawings, wherein like symbols refer to like or corresponding parts throughout the several views:

FIG. 1 is a perspective view of one form of apparatus employed in practicing the present invention.

FIG. 2 is a perspective view of another form of apparatus employed in practicing the present invention with the cooker in the open position.

FIG. 3 is a longitudinal section through the apparatus of FIG. 2 on the line 3—3 showing wieners being cooked therein.

FIG. 4 is a transverse section taken on the lines 4—4 in FIG. 3.

FIG. 5 is a longitudinal section taken through a modified form of the invention.

FIG. 6 is a transverse section taken on the lines 6—6 in FIG. 5.

Referring now to the drawings and for the moment to FIG. 1, 10 designates a heat sink base, upstanding circumferentially spaced metal rods of any preferred metal 11 are provided for holding a wiener 12 spaced from the heat sink base 10 and for conducting heat along the major axis of the wiener while physically spacing the wiener from the cooking heat source and a handle 13 is provided for placing the unit over the heat source.

In the form of the invention shown in FIGS. 2, 3 and 4, the wiener supports 14 and 14A are rod-like members formed from extrusions 15 and 15A and support the wiener 12 along its major axis while spacing the wiener from the cooking energy source grease drain openings 16 are provided to permit cooking grease to drain into a collecting pan 17. The bottoms 18 and 18A of the extrusions 15 and 15A are physically placed in contact with the source of cooking energy. The wiener supports 14 are longer than the supports 14A to permit laying a wiener 12 along its major axis between transversely spaced apart supports 14, as best shown in FIG. 4.

In the form of the invention shown in FIGS. 5 and 6, 20 represents an outer assembly composed of spacer plates 21, 22 which are joined by metallic wiener support rods 23 which may be of stainless steel or aluminum. The inner assembly 24 has a pair of spaced apart plates 25, 26 which are joined by alternate large and small diameter wiener support rods 28 and 27A. A drip pan 28 and a bottom 29 is provided beneath the wiener support rods of the inner assembly. A handle 30 is provided for picking up the entire unit.

The wieners are placed longitudinally in the form of the invention shown in FIGS. 2 through 4 while wieners are placed transversely in the embodiment of FIGS. 5 and 6.

In each form of the invention the wiener is supported by a heat conductor along its major axis and is not exposed directly to the cooking energy source.

In each form of the invention, the heat source is applied as shown by the wavey arrow lines and the wiener is supported from the heat sink block by either metal rods or ridges extending along the major axis of the wiener so that all of the external surface of the wiener is not directly in contact with the heat sink base. The wiener must be cooked by conduction over a plurality of areas less than its whole peripheral lengthwise area so that air passages lie between adjacent wiener contact support areas. I have found that a wiener so cooked has a highly delectable charcoal or charbroiled taste. The source of heat is always indirectly applied to the wiener over less than its external surface area.

What I claim is:

1. A wiener charcoal broiler comprising at least one heat sink block of aluminum for collecting cooking heat, wiener support metal rods carried by said block and positioned to physically conduct said collected cooking heat axially along and circumferentially about the wiener to space the wiener from direct contact with the cooking energy source to physically engage the wiener continuously substantially along its entire length and which physically conducts said collected cooking heat along the major axis and circumferentially of the wiener from said collecting block to the wiener without exposing the wiener directly to the cooking energy source.

2. A wiener charcoal broiler comprising a pair of heat sink blocks of nestable aluminum extrusions having wiener supports extending therefrom to space the wiener from direct contact with the cooking energy source and to physically engage the wiener continuously along its length and circumferentially thereabout and which conducts cooking heat along the major axis of the wiener from said blocks when nested to the wiener without exposing the wiener directly to the cooking energy source.

* * * * *